United States Patent
Moniruzzaman et al.

(10) Patent No.: US 12,215,222 B2
(45) Date of Patent: *Feb. 4, 2025

(54) HIGH MODULUS DUCTILE THERMOPLASTIC COMPOSITIONS HAVING TRANSPARENCY TO RADIO FREQUENCY SIGNALS

(71) Applicant: SHPP Global Technologies B.V., Bergen op Zoom (NL)

(72) Inventors: Mohammad Moniruzzaman, Princeton, NJ (US); Bart Vandormael, Bergen op Zoom (NL); Todd Morris Loehr, Mt. Vernon, IN (US); Lakshmikant Suryakant Powale, Selkirk, NY (US)

(73) Assignee: SHPP Global Technologies B.V., Bergen op Zoom (NL)

( * ) Notice: Subject to any disclaimer, the term of this patent is extended or adjusted under 35 U.S.C. 154(b) by 662 days.

This patent is subject to a terminal disclaimer.

(21) Appl. No.: 17/046,088

(22) PCT Filed: Apr. 10, 2019

(86) PCT No.: PCT/US2019/026786
§ 371 (c)(1),
(2) Date: Oct. 8, 2020

(87) PCT Pub. No.: WO2019/199970
PCT Pub. Date: Oct. 17, 2019

(65) Prior Publication Data
US 2021/0032459 A1   Feb. 4, 2021

Related U.S. Application Data

(60) Provisional application No. 62/655,560, filed on Apr. 10, 2018.

(51) Int. Cl.
*C08L 67/02*   (2006.01)

(52) U.S. Cl.
CPC ........... *C08L 67/02* (2013.01); *C08L 2201/02* (2013.01); *C08L 2201/08* (2013.01); *C08L 2203/20* (2013.01); *C08L 2205/025* (2013.01); *C08L 2205/035* (2013.01); *C08L 2205/08* (2013.01)

(58) Field of Classification Search
CPC combination set(s) only.
See application file for complete search history.

(56) References Cited

U.S. PATENT DOCUMENTS

| 7,786,246 | B2 | 8/2010 | Jansen et al. |
| 9,109,093 | B2 | 8/2015 | Pilliod et al. |
| 9,284,449 | B2 | 3/2016 | Sun et al. |
| 2012/0076573 | A1 | 3/2012 | Pilliod et al. |
| 2015/0368458 | A1 | 12/2015 | Sun et al. |
| 2017/0029615 | A1* | 2/2017 | He .................. C08K 3/013 |

FOREIGN PATENT DOCUMENTS

| CN | 1182101 A | 5/1998 |
| CN | 104403257 A | 3/2015 |
| CN | 106459564 A | 2/2017 |
| KR | 20170023094 A | 3/2017 |
| WO | WO 2015/200272 A2 | 12/2015 |

OTHER PUBLICATIONS

International Patent Application No. PCT/US2019/026786; Int'l Search Report and the Written Opinion; dated Jun. 26, 2019; 11 pages.
International Patent Application No. PCT/US2019/026786; Int'l Preliminary Report on Patentability; dated Oct. 22, 2020; 8 pages.

* cited by examiner

*Primary Examiner* — Robert T Butcher
(74) *Attorney, Agent, or Firm* — Quicker Law, LLC

(57) ABSTRACT

Thermoplastic compositions include: a) from about 5 wt % to about 30 wt % of a thermoplastic polymer component including polycarbonate, polyethylene terephthalate or a combination thereof; b) from about 10 wt % to about 55 wt % of a poly butylene terephthalate component; c) from about 0.1 wt % to about 10 wt % of a polyester elastomer component; d) from 0 wt % to about 10 wt % of an acrylic impact modifier component; e) from 0 wt % to about 10 wt % of an ethylene/alkyl acrylate/glycidyl methacrylate terpolymer compatibilizer component; and f) from about 30 wt % to about 70 wt % of a ceramic fiber component. Articles formed from the thermoplastic compositions and methods of forming the articles are also described.

19 Claims, No Drawings

HIGH MODULUS DUCTILE THERMOPLASTIC COMPOSITIONS HAVING TRANSPARENCY TO RADIO FREQUENCY SIGNALS

FIELD OF THE DISCLOSURE

The present disclosure relates to thermoplastic compositions including a ceramic fiber component, and more particularly to thermoplastic compositions including a ceramic fiber component, a polybutylene terephthalate component, and a thermoplastic polymer component including polycarbonate, polyethylene terephthalate, or combinations thereof.

BACKGROUND OF THE DISCLOSURE

Many consumer-oriented industries, for example, the consumer electronics industry, have a need for blended thermoplastic compositions that provide very high stiffness with balanced ductility and impact resistance, are colorable from white to black, chemically resistant to everyday chemicals, possess excellent flow for thin wall processing, and transparency to wireless signals. Blends including polycarbonate (PC) and polybutylene terephthalate (PBT) with glass fibers can meet the above requirements to some extent, as described in U.S. Pat. No. 9,284,449. Compositions including high flow crystalline resins such as polyether ether ketone polymers (PEEK) or specialty nylon with glass fibers have also been used. Materials containing PEEK desirably have low dielectric interference to wireless signals, but the glass fibers in these compositions have a low stiffness and thus limit the stiffness of compositions incorporating them. Glass fibers are thus not typically used in applications requiring mechanically demanding parts. In addition, the color space (especially white color) is limited with glass fibers as the colorant titanium dioxide breaks down the glass fibers. Fillers with a higher stiffness, such as carbon fibers, have the potential to improve the stiffness of thermoplastic compounds incorporating them, but in most cases higher stiffness negatively affects the ductility (e.g., tensile elongation at break) and reduces freedom of part design. In addition, conventional carbon fibers are not colorable.

These and other shortcomings are addressed by aspects of the present disclosure.

SUMMARY

Aspects of the present disclosure address the stiffness limitations of glass fiber-filled thermoplastic compounds in mechanically demanding consumer electronics parts applications and provides a solution that exhibits a combination of one or more of the properties of high stiffness, high tensile elongation at break, good impact resistance, good colorability, and excellent chemical resistance.

Aspects of the disclosure relate to thermoplastic compositions including: a) from about 5 wt % to about 30 wt % of a thermoplastic polymer component including polycarbonate, polyethylene terephthalate or a combination thereof; b) from about 10 wt % to about 55 wt % of a polybutylene terephthalate component; c) from about 0.1 wt % to about 10 wt % of a polyester elastomer component; d) from 0 wt % to about 10 wt % of an acrylic impact modifier component; e) from 0 wt % to about 10 wt % of an ethylene/alkyl acrylate/glycidyl methacrylate terpolymer compatibilizer component; and f) from about 30 wt % to about 70 wt % of a ceramic fiber component. Articles formed from the thermoplastic compositions and methods of forming the articles are also described.

DETAILED DESCRIPTION

The present disclosure can be understood more readily by reference to the following detailed description of the disclosure and the Examples included therein. In various aspects, the present disclosure pertains to thermoplastic compositions including: a) from about 5 wt % to about 30 wt % of a thermoplastic polymer component including polycarbonate, polyethylene terephthalate or a combination thereof; b) from about 10 wt % to about 55 wt % of a polybutylene terephthalate component; c) from about 0.1 wt % to about 10 wt % of a polyester elastomer component; d) from 0 wt % to about 10 wt % of an acrylic impact modifier component; e) from 0 wt % to about 10 wt % of an ethylene/alkyl acrylate/glycidyl methacrylate terpolymer compatibilizer component; and f) from about 30 wt % to about 70 wt % of a ceramic fiber component. Articles formed from the thermoplastic compositions and methods of forming the articles are also described.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the embodiments "consisting of" and "consisting essentially of" Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate" includes mixtures of two or more polycarbonate polymers.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optional additive material" means that the additive material can or cannot be included in the thermoplastic composition and that the description includes thermoplastic compositions that both include and do not include additive materials.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

The terms "BisA," "BPA," or "bisphenol A," which can be used interchangeably, as used herein refers to a compound having a structure represented by the formula:

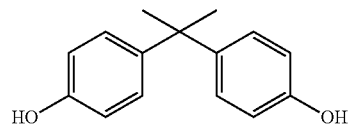 [SMILES: CC(C)(c1ccc(O)cc1)c1ccc(O)cc1]

BisA can also be referred to by the name 4,4'-(propane-2, 2-diyl)diphenol; p,p'-isopropylidenebisphenol; or 2,2-bis(4-hydroxyphenyl)propane. BisA has the CAS #80-05-7.

As used herein, "polycarbonate" refers to an oligomer or polymer comprising residues of one or more dihydroxy compounds, e.g., dihydroxy aromatic compounds, joined by carbonate linkages; it also encompasses homopolycarbonates, copolycarbonates, and (co)polyester carbonates.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Thermoplastic Compositions

Aspects of the disclosure relate to a thermoplastic composition including:
a) from about 5 wt % to about 30 wt % of a thermoplastic polymer component including polycarbonate, polyethylene terephthalate or a combination thereof;
b) from about 10 wt % to about 55 wt % of a polybutylene terephthalate component;
c) from about 0.1 wt % to about 10 wt % of a polyester elastomer component;
d) from 0 wt % to about 10 wt % of an acrylic impact modifier component;
e) from 0 wt % to about 10 wt % of an ethylene/alkyl acrylate/glycidyl methacrylate terpolymer compatibilizer component; and
f) from about 30 wt % to about 70 wt % of a ceramic fiber component.

The combined weight percent value of all components does not exceed 100 wt %, and all weight percent values are based on the total weight of the composition.

The thermoplastic polymer component includes a thermoplastic polymer including polycarbonate, polyethylene terephthalate or a combination thereof. As used herein, polycarbonate refers to an oligomer or polymer comprising residues of one or more dihydroxy compounds, e.g., dihydroxy aromatic compounds, joined by carbonate linkages; it also encompasses homopolycarbonates, copolycarbonates, and (co)polyester carbonates. In certain aspects, the polycarbonate can include any polycarbonate material or mixture of materials, for example, as recited in U.S. Pat. No. 7,786,246, which is hereby incorporated in its entirety for the specific purpose of disclosing various polycarbonate compositions and methods. The thermoplastic polymer component including polycarbonate, polyethylene terephthalate or a combination thereof may be present in an amount of from about 5 wt % to about 30 wt %, from about 10 wt % to about 25 wt %, from about 5 wt % to about 25 wt %, from about 5 wt % to about 18 wt %, or from about 5 wt % to about 20 wt %.

In some aspects the polycarbonate is a homopolymer including repeating units derived from bisphenol A. The polycarbonate may include polycarbonate monomers such as, but not limited to, 2-phenyl-3,3'-bis (4-hydroxy phenyl) phthalimidine (PPPBP) and dimethyl bisphenol cyclohexane (DMBPC). In particular aspects the polycarbonate is a polycarbonate copolymer including repeating units derived from bisphenol A, sebacic acid, polysiloxane, isophthalate terephthalate resorcinol (ITR), phosphate or a combination thereof. Exemplary polycarbonate copolymers include, but are not limited to, polycarbonate-siloxane copolymer (such as EXL resin available from SABIC), isophthaloyl and terephthaloyl resorcinol (ITR) polyester-carbonate (such as SLX resin available from SABIC), high flow high heat polycarbonate copolymer (such as XHT resin available from SABIC), oligomeric phosphonate (such as FRX resin available from FRX Polymers, Inc.). The polycarbonate may be end-capped and may include, but is not limited to, the following endcapping agents: 1,1',1",-tris (4'-hydroxyphenyl) ethane (THPE) and p-hydroxybenzonitrile (HBN). HBN-endcapped polycarbonate (such as CFR polycarbonate resin available from SABIC) could contribute to flame retardancy (FR) performance of the thermoplastic compositions. The polycarbonate may include a post-consumer recycle polycarbonate.

As used herein, polyethylene terephthalate (PET) can be used interchangeably with poly(ethyl benzene-1,4-dicarboxylate). As with polybutylene terephthalate, polyethylene terephthalate is a type of polyester.

The thermoplastic polymer component can include polycarbonate, PET or a combination thereof, and may be present in an amount of from about 5 wt % to about 30 wt % in the thermoplastic composition.

The thermoplastic composition may include from about 10 wt % to about 55 wt % of a polybutylene terephthalate (PBT) component. In further examples, the thermoplastic composition may include from about 10 wt % to about 45 wt %, from about 10 wt % to about 35 wt %, from about 5 wt % to about 30 wt %, from about 5 wt % to about 25 wt % of a PBT component. As used herein, polybutylene terephthalate can be used interchangeably with poly(1,4-butylene terephthalate). PBT is one type of polyester. Polyesters, which include poly(alkylene dicarboxylates), liquid crystalline polyesters, and polyester copolymers, can be useful in the disclosed thermoplastic compositions of the present disclosure. The polybutylene terephthalate may include a chemically-upcycled PBT, such as the VALOX™ resins available from SABIC.

In some aspects, the composition includes from about 0.1 wt % to about 10 wt % of a polyester elastomer component. The polyester elastomer component may include, but is not limited to, polybutylene tere/isophthalate-co-polyoxybutylene. In a particular aspect the polyester elastomer component is HYTREL 4056, available from DuPont.

The thermoplastic composition includes from 0 wt % to about 10 wt % of an acrylic impact modifier component. The acrylic impact modifier may include, but is not limited to, an ethylene-ethyl acrylate copolymer. In a particular aspect the acrylic impact modifier component ELVALOY™ AC 2615, available from DuPont, which is an ethylene-ethyl acrylate copolymer having an ethyl acrylate content below 20%.

In some aspects the composition includes from 0 wt % to about 10 wt %, or from 0 wt % to 5 wt %, or from 0.01 wt % to 5 wt %, or from 0.01 wt % to 8 wt %, or from 0.01 to 10 wt % of an ethylene/alkyl acrylate/glycidyl methacrylate terpolymer compatibilizer component. The ethylene/alkyl acrylate/glycidyl methacrylate terpolymer compatibilizer component may include, but is not limited to, ethylene methyl acrylate glycidyl methacrylate, ethylene ethyl acrylate glycidyl methacrylate, and combinations thereof. In a particular aspect the ethylene/alkyl acrylate/glycidyl methacrylate terpolymer compatibilizer component is a PC/terpolymer blend, such as Lotader™ AX8900, available from Arkema. In certain aspects in which the thermoplastic polymer component includes polyethylene terephthalate and not polycarbonate, it may be possible to omit the ethylene/alkyl acrylate/glycidyl methacrylate terpolymer compatibilizer component from the thermoplastic composition. In such aspects the ethylene/alkyl acrylate/glycidyl methacrylate terpolymer compatibilizer component may be present in the thermoplastic composition in a range of from 0 wt % to about 10 wt %.

The thermoplastic composition includes from about 30 wt % to about 70 wt %, or from about 30 wt % to about 80 wt %, or from about 45 wt % to about 75 wt %, or from about 50 wt % to 70 wt %, or from about 55 wt % to about 65 wt %, or from about 35 wt % to about 70 wt % of a ceramic fiber component. The ceramic fiber component can include any suitable type of ceramic fiber. In certain aspects the ceramic fiber includes, but is not limited to, alumina, polycrystalline alumina, aluminum silicate, and combinations thereof. In a particular aspect the ceramic fiber component includes a chopped ceramic fiber such as NEXTEL™ 610, available from 3M, which is a ⅛ inch (3.2 millimeter (mm)) chopped ceramic oxide fiber (alumina $Al_2O_3$, alpha-alumina based). The ceramic fiber may in some aspects have a tensile modulus of at least about 150 gigapascals (GPa). In further aspects the ceramic fiber has a tensile modulus of from about 150 GPa to about 500 GPa, or from about 150 GPa to about 300 GPa. The ceramic fiber may be chopped and have a length from about 0.1 millimeter (mm) to about 12 mm.

The thermoplastic composition may include a transesterification quenching agent. The transesterification quenching agent may be included as a processing aid and could help prevent a transesterification reaction between polycarbonate and PBT (when PC is included in the thermoplastic polymer component). The transesterification quenching agent may be omitted where the thermoplastic polymer component includes PET. In a further aspect, the transesterification quenching agent is a phosphorus-containing stabilizer. In a still further aspect, the transesterification quenching agent includes a phosphorus-containing stabilizer. In a yet further aspect, the transesterification quenching agent is an acidic phosphate salts, e.g. a monozinc phosphate, sodium dihydrogen phosphate, potassium hydrogen phosphate, calcium hydrogen phosphate, sodium acid pyrophosphate and mixtures thereof. In an even further aspect, the transesterification quenching agent includes a phosphite compounds, e.g. a phosphite compound of the general formula $P—(OR')_3$ wherein each R' is the same or different and independently represents hydrogen, alkyl groups, aryl groups or any mixture thereof provided that at least one of the R' groups is hydrogen or alkyl. Illustratively, these include, but are not limited to, diphenylisodecyl phosphite, diisooctyl phosphite, dilauryl phosphite, diphenyl phosphite, phenyl diisodecyl phosphite, ethyl hexyl diphenyl phosphite, stearyl phosphite and mixtures thereof. In a still further aspect, the transesterification quenching agent comprises a Group IB or Group IIB phosphate salt such as zinc phosphate. In a further aspect, the transesterification quenching agent comprises a phosphorous oxo-acid such as phosphorous acid, phosphoric acid, polyphosphoric acid, or hypophosphorous acid.

In a further aspect, the phosphorus-containing stabilizer is selected from zinc phosphate, diphenylisodecyl phosphite, monosodium phosphate and sodium acid pyrophosphate and mixtures thereof. In a still further aspect, the phosphorus-containing stabilizer is zinc phosphate.

In a further aspect, the transesterification quenching agent is selected from an acidic phosphate salt, a Group IB phosphate salt, a Group JIB phosphate salt, a phosphorus oxo-acid, and mixtures thereof. In a still further aspect, the transesterification quenching agent is an acidic phosphate salt. In a yet further aspect, the transesterification quenching agent is selected from a Group IB phosphate salt and a Group IIB phosphate salt. In an even further aspect, the transesterification quenching agent is mono zinc phosphate. In a still further aspect, the transesterification quenching agent is a phosphorus oxo-acid. The transesterification quenching agent can be sodium stearate. In particular aspects the transesterification quenching agent may include, but is not limited to, an acidic phosphate salt, a Group IB phosphate salt, a Group IIB phosphate salt, a phosphorus oxo-acid, and combinations thereof.

When included, the transesterification quenching agent may be present in the thermoplastic composition in an amount from greater than about 0 wt % to about 1 wt %.

In addition to the foregoing components, the disclosed thermoplastic compositions can optionally include a balance amount of one or more additive materials ordinarily incorporated in thermoplastic compositions of this type, with the proviso that the additives are selected so as to not significantly adversely affect the desired properties of the thermoplastic composition. Combinations of additives can be used. Such additives can be mixed at a suitable time during the mixing of the components for forming the composition. Exemplary and non-limiting examples of additive materials that can be present in the disclosed thermoplastic compositions include an antioxidant, a colorant, a de-molding agent, a dye, a flow promoter, a flow modifier, a light stabilizer, a lubricant, a mold release agent, a pigment, a quenching agent, a thermal stabilizer, an ultraviolet (UV) absorbant, a UV reflectant, a UV stabilizer, an epoxy chain extender, a flame retardant, and combinations thereof.

In particular aspects, an epoxy chain extender additive may be included in the thermoplastic composition to counteract the basicity of the ceramic fiber and/or to help improve/increase long-term mechanical strength retention of the composition. Exemplary epoxy chain extender additives may include, but are not limited to, diglycidil ether and one or more of the JONCRYL™ products available from BASF Corp.

Suitable flame retardant additives include, but are not limited to, (bisphenol A bis(diphenyl phosphate) (BPADP), resorcinol bis (diphenyl phosphate) (RDP), oligomeric phosphate ester (e.g., FYROFLEX™ SolDP), phosphazene, non-halogenated flame retardants such as those available from FRX Polymers, alumina phosphinate, zinc phosphinate, and combinations thereof. The flame retardant additive may also include conventional flame retardant synergists, including but not limited to melamine polyphosphate (MPP), melamine cyanurate and combinations thereof.

In some examples, a molded sample of the thermoplastic composition has a tensile modulus of at least about 25 gigapascals (GPa) as determined in accordance with ASTM D638. In further examples, a molded sample of the thermoplastic composition has a tensile modulus of from about 15 GPa to about 200 GPa, or from about 20 GPa to about 150 GPa, or from about 25 GPa to about 100 GPa.

In certain aspects a molded sample of the thermoplastic composition has a tensile elongation at break of at least about 1.5% as determined in accordance with ASTM D638. In further aspects a molded sample of the thermoplastic composition has a tensile elongation at break of from about 1% to about 10%, or from about 1.5% to about 5%.

In particular aspects a molded sample of the thermoplastic composition has a notched Izod impact strength of at least about 100 Joules per meter (J/m) as determined in accordance with ASTM D256. A molded sample of the thermoplastic composition may in some aspects have a notched Izod impact strength of from about 100 J/m to about 1000 J/m, or from about 100 J/m to about 750 J/m, or from about 100 J/m to about 500 J/m, or from about 140 J/m to about 1000 J/m, or from about 140 J/m to about 500 J/m, or greater than about 140 J/m.

The thermoplastic composition may be transparent to radio frequency signals in some aspects. The thermoplastic composition may be transparent to wireless signals. The ceramic fiber therein may be radio transparent. Transparent to radio frequency signals or radio transparent may describe that the thermoplastic composition allows passage of signals, that is radio frequency signals, therethrough. The thermoplastic composition may allow passage of at least a portion of radio frequency signals therethrough or may allow a substantial portion of radio frequency signals therethrough. For example, the thermoplastic composition may allow passage of at least 85%, 90%, 95%, or 99% of radio frequency signals therethrough.

In certain aspects the thermoplastic composition is colorable. In particular aspects the thermoplastic composition is colorable to an arctic white, seashell white or an accessory black color. The thermoplastic composition may be colorable in achromatic colors of black, white or gray. In further aspects the thermoplastic composition is colorable in shades of color, including but not limited to the colors of red, green, blue, yellow, orange and violet. In certain aspects the thermoplastic composition may have a chromaticity (C) in the L*C*h color space of less than about 40. The L*C*h color space is defined by Commission Internationale de l'Eclairage (CIE) and may be determined in accordance with ASTM D2244.

In some examples, the thermoplastic composition may include from about 0.5 wt % to about 20 wt % titanium dioxide. In particular aspects the thermoplastic composition may include from about 4 wt % to about 15 wt %, or from about 3 wt % to about 8 wt %, titanium dioxide. Conventional thermoplastic compositions typically demonstrate a decrease in tensile properties when titanium dioxide is included in the composition. Thermoplastic compositions according to aspects of the disclosure, however, may exhibit good tolerance to titanium dioxide. For example, in certain aspects a molded sample of the thermoplastic composition retains at least 80% of its tensile properties—including tensile modulus, tensile strength, and/or stiffness—as compared to a substantially identical molded sample that does not include titanium dioxide. As used herein, a "substantially identical molded sample that does not include titanium dioxide" is a molded sample including the same components, and the same amounts of the components, except that the "substantially identical molded sample" does not include titanium dioxide. In other words, the comparative sample is otherwise identical to the molded sample according to the disclosure, except that the comparative sample does not include titanium dioxide. It will be recognized that if the comparative sample includes titanium dioxide then the amount of one or more other components will need to be reduced to compensate for the titanium dioxide; typically the content of predominant thermoplastic components (e.g., PC/PET and PBT) are reduced proportionally to account for the increase in titanium dioxide.

When it is desirable to color the thermoplastic compositions to darker shades (e.g., black or gray), the thermoplastic compositions may include from about 0.1 wt % to about 5 wt % of a dark pigment, including but not limited to carbon black. In some aspects thermoplastic compositions may include from about 0.5 wt % to about 3 wt % carbon black.

Thermoplastic compositions according to aspects of the disclosure may be chemically resistant, i.e., the mechanical properties (including tensile modulus, tensile strength and/or stiffness) and/or the visual appearance of the thermoplastic composition are not negatively affected when exposed to common chemicals that these thermoplastic compositions encounter. For example, thermoplastic compositions according to the present disclosure may be used in consumer electronics applications (e.g., a wireless communication device) and may be exposed to chemicals such as, but not limited to: adhesives used to adhere the composition (or an article including it) to other parts of the electronics apparatus; sunscreen; and insect repellant. The thermoplastic composition—and articles including them—could thus be subject to chemical attack on external surfaces (e.g., sunscreen and insect repellant) and internal surfaces (e.g., adhesives). Thus, in certain aspects the thermoplastic compositions are chemically resistant to adhesives, sunscreen, insect repellant or a combination thereof. In one particular aspect, the thermoplastic composition is chemically resistant to a heat-cured urethane adhesive. In another particular aspect, the thermoplastic composition is chemically resistant to a moisture-cured urethane adhesive.

In further aspects thermoplastic compositions according to aspects of the disclosure are chemically resistant to a change in mechanical properties when exposed to adhesives, sunscreen and/or insect repellant; i.e., a molded sample of the thermoplastic composition retains at least 80% of its tensile properties—including tensile modulus, tensile strength, and/or stiffness—after exposure to adhesives, sunscreen and/or insect repellant.

In some aspects the thermoplastic composition is flame retardant. In certain aspects, the thermoplastic composition or a molded sample thereof achieves a UL 94 rating of V-2 or higher (V-1 or V-0) at a thickness of 0.8 mm or higher.

Articles of Manufacture

In certain aspects, the present disclosure pertains to shaped, formed, or molded articles including the thermoplastic compositions. The thermoplastic compositions can be molded into useful shaped articles by a variety of means as described below.

Articles formed from thermoplastic compositions according to the present disclosure may include, but are not limited to: a communication device; a computer device; an electromagnetic interference device; a printed circuit; a Wi-Fi device; a Bluetooth device; a GPS device; a cellular antenna device; a smart phone device; a wireless communication device; a structured media enclosure; an antenna concealing enclosure; an enclosure for networking equipment (including routers, switches, hubs, modems and servers); a structural component of an electronic device; a portable computing device; a hand-held electronic device; an automotive device; a medical device; a sensor device; a security device; a shielding device; an RF antenna device; an LED device; and an RFID device.

Methods for Making Articles Including the Thermoplastic Compositions

Articles including the thermoplastic compositions according to aspects described herein may be formed according to any conventional method. In some aspects the article is extrusion-molded, injection-molded, compression-molded, thermoformed, overmolded, or insert-molded with a metallic or composite laminate insert.

If extrusion-molded, the one or any foregoing components described herein may first be dry blended together, then fed into an extruder from one or multi-feeders, or separately fed into an extruder from one or multi-feeders. The one or any foregoing components may be first dry blended with each other, or dry blended with any combination of foregoing components, then fed into an extruder from one or multi-feeders, or separately fed into an extruder from one or multi-feeders. The components may be fed into the extruder from a throat hopper or any side feeders.

The extruders used in the invention may have a single screw, multiple screws, intermeshing co-rotating or counter rotating screws, non-intermeshing co-rotating or counter rotating screws, reciprocating screws, conical screws, screws with pins, screws with screens, barrels with pins, rolls, rams, helical rotors, co-kneaders, disc-pack processors, various other types of extrusion equipment, or combinations comprising at least one of the foregoing.

The barrel temperature on the extruder during compounding can be set at the temperature where at least a portion of the thermoplastic polymer(s) in the thermoplastic composition have reached a temperature greater than or equal to about the melting temperature, if the thermoplastic polymer(s) is a semi-crystalline organic polymer, or the flow point (e.g., the glass transition temperature) if the thermoplastic polymer(s) is an amorphous polymer.

The mixture including the foregoing mentioned components may be subject to multiple blending and forming steps if desirable. For example, the thermoplastic composition may first be extruded and formed into pellets. The pellets may then be fed into a molding machine where it may be formed into any desirable shape or product. Alternatively, the thermoplastic composition emanating from a single melt blender may be formed into sheets or strands and subjected to post-extrusion processes such as annealing, uniaxial or biaxial orientation.

In particular aspects in which the article is extrusion-molded, a method for making a thermoplastic composition includes: combining the components of the thermoplastic composition to form a mixture; adding the mixture at a feed throat of an extruder and compounding the mixture in the extruder; and extruding the mixture into a mold to form the article. In other aspects one or more of the components of the thermoplastic composition (e.g., the ceramic fiber component) may be added downstream in the extruder according to conventional methods.

Various combinations of elements of this disclosure are encompassed by this disclosure, e.g., combinations of elements from dependent claims that depend upon the same independent claim.

Aspects of the Disclosure

In various aspects, the present disclosure pertains to and includes at least the following aspects.

Aspect 1A. A thermoplastic composition comprising:
a) from about 5 wt % to about 30 wt % of a thermoplastic polymer component comprising polycarbonate, polyethylene terephthalate or a combination thereof;
b) from about 10 wt % to about 55 wt % of a polybutylene terephthalate component;
c) from about 0.1 wt % to about 10 wt % of a polyester elastomer component;
d) from 0 wt % to about 10 wt % of an acrylic impact modifier component;
e) from 0 wt % to about 10 wt % of an ethylene/alkyl acrylate/glycidyl methacrylate terpolymer compatibilizer component; and
f) from about 30 wt % to about 70 wt % of a ceramic fiber component, wherein
the combined weight percent value of all components does not exceed 100 wt %, and
all weight percent values are based on the total weight of the composition.

Aspect 1B. A thermoplastic composition consisting of:
a) from about 5 wt % to about 30 wt % of a thermoplastic polymer component comprising polycarbonate, polyethylene terephthalate or a combination thereof;
b) from about 10 wt % to about 55 wt % of a polybutylene terephthalate component;
c) from about 0.1 wt % to about 10 wt % of a polyester elastomer component;
d) from 0 wt % to about 10 wt % of an acrylic impact modifier component;
e) from 0 wt % to about 10 wt % of an ethylene/alkyl acrylate/glycidyl methacrylate terpolymer compatibilizer component; and
f) from about 30 wt % to about 70 wt % of a ceramic fiber component, wherein
the combined weight percent value of all components does not exceed 100 wt %, and all weight percent values are based on the total weight of the composition.

Aspect 1C. A thermoplastic composition consisting essentially of:
a) from about 5 wt % to about 30 wt % of a thermoplastic polymer component comprising polycarbonate, polyethylene terephthalate or a combination thereof;
b) from about 10 wt % to about 55 wt % of a polybutylene terephthalate component;
c) from about 0.1 wt % to about 10 wt % of a polyester elastomer component;
d) from 0 wt % to about 10 wt % of an acrylic impact modifier component;
e) from 0 wt % to about 10 wt % of an ethylene/alkyl acrylate/glycidyl methacrylate terpolymer compatibilizer component; and
f) from about 30 wt % to about 70 wt % of a ceramic fiber component, wherein
the combined weight percent value of all components does not exceed 100 wt %, and all weight percent values are based on the total weight of the composition.

Aspect 1D. A thermoplastic composition consisting essentially of:
a) from about 5 wt % to about 30 wt % of a thermoplastic polymer component comprising polycarbonate, polyethylene terephthalate or a combination thereof;
b) from about 10 wt % to about 55 wt % of a polybutylene terephthalate component;
c) from about 0.1 wt % to about 10 wt % of a polyester elastomer component;
d) from 0.01 wt % to about 10 wt % of an acrylic impact modifier component;
e) from 0.01 wt % to about 10 wt % of an ethylene/alkyl acrylate/glycidyl methacrylate terpolymer compatibilizer component; and
f) from about 30 wt % to about 70 wt % of a ceramic fiber component, wherein
the combined weight percent value of all components does not exceed 100 wt %, and all weight percent values are based on the total weight of the composition.

Aspect 1E. A thermoplastic composition consisting essentially of:
a) from about 5 wt % to about 30 wt % of a thermoplastic polymer component comprising polycarbonate, polyethylene terephthalate or a combination thereof;
b) from about 10 wt % to about 55 wt % of a polybutylene terephthalate component;
and
c) from about 30 wt % to about 70 wt % of a ceramic fiber component, wherein
the combined weight percent value of all components does not exceed 100 wt %, and all weight percent values are based on the total weight of the composition.

Aspect 2. The composition according to Aspect 1A-1E, wherein the polycarbonate is a homopolymer comprising repeating units derived from bisphenol A.

Aspect 3. The composition according to Aspect 1A-1E, wherein the polycarbonate is a polycarbonate copolymer comprising repeating units derived from bisphenol A, sebacic acid, polysiloxane, isophthalate terephthalate resorcinol (ITR), phosphate or a combination thereof.

Aspect 4. The composition according to any of Aspects 1A to 3, wherein the ceramic fiber component has a tensile modulus of at least 150 GPa.

Aspect 5. The composition according to any of Aspects 1A to 4, wherein the ceramic fiber component is chopped and has a length from about 0.1 millimeter (mm) to about 12 mm.

Aspect 6. The composition according to any of Aspects 1A to 5, wherein the ceramic fiber component comprises alumina.

Aspect 7. The composition according to any of Aspects 1A to 6, further comprising a transesterification quenching agent.

Aspect 8. The composition according to Aspect 7, wherein the transesterification quenching agent is selected from the group consisting of: an acidic phosphate salt; a Group IB phosphate salt; a Group IIB phosphate salt; a phosphorus oxo-acid; and combinations thereof.

Aspect 9. The composition according to Aspect 7 or 8, wherein the transesterification quenching agent is present in an amount from greater than about 0 wt % to about 1 wt %.

Aspect 10. The composition according to any of Aspects 1 to 9, further comprising an additive material, the additive material selected from the group consisting of: an antioxidant; a colorant; a de-molding agent; a dye; a flow promoter; a flow modifier; a light stabilizer; a lubricant; a mold release agent; a pigment; a quenching agent; a thermal stabilizer; a UV absorbant; a UV reflectant; a UV stabilizer; an epoxy chain extender; a flame retardant; and combinations thereof.

Aspect 11. The composition according to any of Aspects 1A to 10, wherein a molded sample of the thermoplastic composition has a tensile modulus of at least about 25 gigapascals (GPa) as determined in accordance with ASTM D638.

Aspect 12. The composition according to any of Aspects 1A to 11, wherein a molded sample of the thermoplastic composition has a tensile elongation at break of at least about 1.5% as determined in accordance with ASTM D638.

Aspect 13. The composition according to any of Aspects 1A to 12, wherein a molded sample of the thermoplastic composition has a notched Izod impact strength of at least about 100 Joules per meter (J/m) as determined in accordance with ASTM D256.

Aspect 14. The composition according to any of Aspects 1A to 13, wherein the thermoplastic composition is transparent to radio frequency signals.

Aspect 15. The composition according to any of Aspects 1A to 14, wherein the thermoplastic composition is colorable in achromatic colors of black, white or gray.

Aspect 16. The composition according to any of Aspects 1A to 15, wherein the thermoplastic composition further comprises from about 0.5 wt % to about 20 wt % titanium dioxide.

Aspect 17. The composition according to Aspect 16, wherein the thermoplastic composition exhibits good tolerance to titanium dioxide.

Aspect 18. The composition according to Aspect 16 or 17, wherein a molded sample of the thermoplastic composition retains at least 80% of its tensile properties as compared to a substantially identical molded sample that does not include titanium dioxide.

Aspect 19. The composition according to any of Aspects 1A to 18, wherein the thermoplastic composition is chemically resistant.

Aspect 20. The composition according to any of Aspects 1A to 19, wherein the thermoplastic composition is flame retardant.

Aspect 21. The composition according to any of Aspects 1A to 20, wherein a molded sample of the thermoplastic composition has a tensile modulus of at least about 25 GPa and a tensile elongation at break of at least about 1.5%, wherein tensile modulus and tensile elongation at break are determined in accordance with ASTM D638.

Aspect 21A The composition according to any of Aspects 1A to 21, wherein the composition is colorable.

Aspect 22. The composition according to any of Aspects 1 to 21A, wherein the composition is colorable in achromatic colors of black, white or gray.

Aspect 23. The composition according to any of Aspects 1 to 22, wherein the composition is colorable in shades of color, including but not limited to the colors of red, green, blue, yellow, orange and violet.

Aspect 24. The composition according to Aspect 22 or 23, wherein the composition has a chromaticity (C) in the L*C*h color space of less than about 40 as determined in accordance with ASTM D2244.

Aspect 25. The composition according to any of Aspects 1A to 24, wherein the composition further comprises from about 4 wt % to about 20 wt % titanium dioxide.

Aspect 26. The composition according to any of Aspects 1A to 25, wherein the composition further comprises from about 0.1 wt % to about 5 wt % of a dark pigment.

Aspect 27. The composition according to Aspect 26, wherein the composition comprises from about 0.5 wt % to about 3 wt % of the dark pigment.

Aspect 28. The composition according to Aspect 26 or 27, wherein the dark pigment is carbon black.

Aspect 29. The composition according to any of Aspects 1A to 28, wherein the composition is chemically resistant to adhesives, sunscreen, insect repellant or a combination thereof.

Aspect 30. The composition according to Aspect 29, wherein the composition is chemically resistant to a heat-cured urethane adhesive.

Aspect 31. The composition according to Aspect 29 or 30, wherein the composition is chemically resistant to a moisture-cured urethane adhesive.

Aspect 32. An article comprising a composition according to any of Aspects 1 to 31.

Aspect 33. The article according to Aspect 32, wherein the article is extrusion-molded, injection-molded, compression-molded, thermoformed, overmolded, or insert-molded with a metallic or composite laminate insert.

Aspect 34. The article according to Aspect 32 or 33, wherein the article is selected from the group consisting of: a communication device; a computer device; an electromagnetic interference device; a printed circuit; a Wi-Fi device; a Bluetooth device; a GPS device; a cellular antenna device; a smart phone device; a wireless communication device; a structured media enclosure; an antenna concealing enclosure; an enclosure for networking equipment; a structural component of an electronic device; a portable computing device; a hand-held electronic device; an automotive device; a medical device; a sensor device; a security device; a shielding device; an RF antenna device; an LED device; and an RFID device.

Aspect 35. A thermoplastic composition consisting essentially of:
  a) from about 10 wt % to about 25 wt % of a thermoplastic polymer component comprising polycarbonate, polyethylene terephthalate or a combination thereof;
  b) from about 10 wt % to about 55 wt % of a polybutylene terephthalate component;
  and c) from about 40 wt % to about 70 wt % of a ceramic fiber component, wherein
the combined weight percent value of all components does not exceed 100 wt %, and
all weight percent values are based on the total weight of the composition.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Inventive compositions according to the present disclosure (Ex.1-Ex.3) and comparative compositions (C.1 and C.2) were produced on a ten-barrel twin-screw extruder. The polymer components and the additional/additive components were added into the feed throat, while the ceramic fibers were fed downstream in a separate port. Barrel temperatures for the PC/PBT samples were around 265.6° C. (510° F.). Injection molding was done on an 85-ton machine. The melt temperature was around 510° F. and the melt temperature was around 200° F.

As shown in Table 1, inventive compositions included the following: PBT, PC and ceramic fiber (Ex.1), PBT, high flow PC and ceramic fiber (Ex.2); and PBT, PET and ceramic fiber (Ex.3). Comparative composition C.1 included PBT, PC and glass fiber. All samples included a combination of impact modifiers.

Properties of these compositions are shown in Table 2.

TABLE 1

PBT/PC blends (example and comparative)

| Component | Function | Unit | Ex. 1 | Ex. 2 | Ex. 3 | C. 1 |
|---|---|---|---|---|---|---|
| VALOX ™ 315 GR-1001 | PBT resin | % | 5.38 | 5.38 | 3.48 | 5.38 |
| VALOX ™ 195-1001 | PBT resin | % | 18.47 | 18.47 | 12.35 | 18.47 |
| LEXAN ™ ML 7655-color 111N | High flow PC | % | — | 7.80 | — | — |
| LEXAN ™ 104-color 111N | Polycarbonate | % | 7.80 | — | — | 7.80 |
| DAK Americas PET | Polyethylene terephthalate resin | % | — | — | 15.83 | — |
| 3M NEXTEL ™ 610 ⅛" chopped | ceramic fiber; alumina based ($\alpha$-$Al_2O_3$) | % | 60 | 60 | 60 | — |
| Johns Manville 718 GF | Glass fiber; E-glass | % | — | — | — | 60 |
| LOTADER ™ AX8900 (PC/terpolymer blend) | Copolymer EMAGMA Ethylene-terpolymer of ethylene-methyl acrylate-glycidyl methacrylate; Impact modifier | % | 3 | 3 | 3 | 3 |
| HYTREL ™ 4056 polyester elastomer | Polybutylene tere/isophthalate copolyoxybutylene Impact modifier; adhesion promoter | % | 2.5 | 2.5 | 2.5 | 2.5 |
| GLYCOLUBE ™ Lonza PETS | Pentaerythritol tetrastearate; Mold release | % | 0.2 | 0.2 | 0.2 | 0.2 |
| EVERNOX ™ 10 | pentaerythritol tetrakis (3-(3,5-di-tert-butyl-4-hydroxyphenyl)propionate); Stabilizer | % | 0.1 | 0.1 | 0.1 | 0.1 |
| EVERFOS ™ 168 | Tris (2,4-di-tert-butylphenyl) phosphite; Stabilizer | % | 0.2 | 0.2 | 0.2 | 0.2 |
| Mono zinc phosphate, MZP | Transesterification stabilizer | % | 0.1 | 0.1 | 0.1 | 0.1 |
| TINUVIN ™ 329 | UV stabilizer | % | 0.25 | 0.25 | 0.25 | 0.25 |
| Ethylene-ethyl acrylate copolymer with EA below 20% | Impact modifier | % | 2 | 2 | 2 | 2 |

TABLE 2

Properties of compositions of Table 1

| Property | Unit | Ex. 1 | Ex. 2 | Ex. 3 | C. 1 |
|---|---|---|---|---|---|
| Specific gravity | — | 2.0 | 2.0 | 2.0 | 1.8 |
| Flexural modulus | MPa | 24200 | 23100 | 22700 | 16400 |
| Flexural stress at yield | MPa | 207 | 183 | 181 | 207 |
| Tensile modulus | GPa | 32.7 | 30.6 | 29.5 | 19.3 |
| Tensile strength at yield | MPa | 124 | 112 | 110 | 145 |
| Tensile strength at break | MPa | 123 | 111 | 108 | 142 |

TABLE 2-continued

Properties of compositions of Table 1

| Property | Unit | Ex. 1 | Ex. 2 | Ex. 3 | C. 1 |
|---|---|---|---|---|---|
| % elongation at yield | % | 2.06 | 1.79 | 1.94 | 1.82 |
| % elongation at break | % | 2.32 | 1.98 | 2.34 | 1.85 |
| Notched Izod impact strength | J/m | 172 | 159 | 158 | 160 |
| Unnotched Izod impact strength | J/m | 813 | 810 | 933 | 876 |
| MVR (275° C., 5 Kg) | cm$^3$/10 min | 25 | 20.7 | 12.7 | 9 |

The data in Table 2 show that ceramic fiber compounds exhibit very high stiffness (greater than 25 GPa tensile modulus) which cannot be achieved by glass fiber thermoplastic compounds. Surprisingly, this large improvement in stiffness did not compromise the ductility, e.g., elongation at break. Ceramic fiber compounds exhibited similar or higher tensile elongation at break and notched and unnotched Izod impact strength. For example, Ex.1 and C.1 have similar compositions except for the fillers: Ex.1 with ceramic fiber had about a 70% improvement in stiffness compared to the same formulation including E glass fiber instead of ceramic fibers. Moreover, Ex.1 also shows a higher elongation at break.

An additional comparative composition (C.2) was formed from nylon and ceramic fiber, rather than the disclosed combination of PBT/PC or PBT/PET, as shown in Table 3:

TABLE 3

Comparative formulation including nylon and ceramic fiber

| Item Description | Function/ID | Unit | C. 2 |
|---|---|---|---|
| ZYTEL ™ 151 DuPont | Polyamide; nylon 6/12 resin | % | 39.7 |
| Rhodia NaH$_2$PO$_2$ | Sodium hypophosphite | % | 0.1 |
| ACRAWAX ™ C Lonza | N,N' ethylene bisstearamide | % | 0.2 |
| 3M NEXTEL ™ 610 | chopped ceramic fiber (alumina) | % | 60 |

Properties of comparative composition C.2 are shown in Table 4:

TABLE 4

Properties of C.2 (composition of Table 3)

| Properties | Unit | Value |
|---|---|---|
| Tensile Modulus | GPa | 33.2 |
| Tensile Strength | MPa | 134 |
| Tensile Elongation | % | 0.69 |
| Notched Izod Impact Strength | J/m | 72 |
| Unnotched Izod Impact Strength | J/m | 369 |

Table 4 shows that the elongation at break for ceramic fiber compounds is also resin/composition dependent. The nylon-based compound C.2, having 60 wt % ceramic fiber, exhibits very good stiffness, but the tensile elongation at break is poor. Comparison of Ex.1 with C.2 demonstrates the improved properties provided by the PC/PBT/ceramic fiber compositions of the present disclosure.

An additional exemplary composition (Ex.4) including titanium dioxide (TiO$_2$) was formed as shown in Table 5 below. Exemplary composition Ex.1 is provided for comparison:

TABLE 5

PC/PBT blends including TiO$_2$

| Component | Unit | Ex. 4 | Ex. 1 (from Table 1) |
|---|---|---|---|
| VALOX ™ 315GR-1001 | % | 5.37 | 5.38 |
| VALOX ™ 195-1001 | % | 14.71 | 18.47 |
| LEXAN ™ 104-111N | % | 6.57 | 7.80 |
| 3M NEXTEL ™ 610 | % | 60 | 60 |
| LOTADER ™ AX8900 | % | 3 | 3 |
| HYTREL ™ 4056 polyester elastomer | % | 2.5 | 2.5 |
| GLYCOLUBE ™ PETS | % | 0.2 | 0.2 |
| EVERNOX ™ 10 | % | 0.1 | 0.1 |
| EVERFOS ™ 168 | % | 0.2 | 0.2 |
| MZP | % | 0.1 | 0.1 |
| TINUVIN ™ 329 | % | 0.25 | 0.25 |
| Ethylene-ethyl acrylate copolymer with EA less than 20% | % | 2 | 2 |
| TiO$_2$ | % | 5 | — |

The amount of PBT (VALOX™ 315GR-1001 and VALOX™ 195-1001) and PC (Lexan 104-111N) in Ex.4 were proportionally reduced to account for the addition of 5% titanium dioxide; i.e., the ratio of PBT to PC was maintained in Ex.4 compared to Ex.1. In other words, Ex.4 is a "substantially identical" composition to Ex.1 except for the inclusion of titanium dioxide.

Mechanical properties of Ex.4 (with those of Ex.1 from Table 2 provided for comparison) are shown in Table 6:

TABLE 6

Properties of PC/PBT/ceramic fiber composition including TiO$_2$

| Property | Unit | Ex. 1 | Ex. 4 | Property Retention (%) |
|---|---|---|---|---|
| Tensile modulus | GPa | 32.7 | 31.3 | 96 |
| Tensile strength at yield | MPa | 124 | 118 | 95 |
| Tensile strength at break | MPa | 123 | 117 | 95 |
| % elongation at yield | % | 2.06 | 1.96 | 95 |
| % elongation at break | % | 2.32 | 2.08 | 90 |

As shown in Table 6, exemplary composition Ex.4 including titanium dioxide maintains at least 90% of its tensile properties as compared to Ex.1 that does not include titanium dioxide. Such compositions thus exhibit good tolerance to titanium dioxide.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided allow the reader to quickly ascertain the nature of the technical disclosure. It is submitted with the understanding that it will not be used to interpret or limit the scope or meaning of the claims. Also, in the above description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

While typical aspects have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A thermoplastic composition comprising:
   a) from about 5 wt % to about 30 wt % of a thermoplastic polymer component comprising polycarbonate, polyethylene terephthalate or a combination thereof;
   b) from about 10 wt % to about 35 wt % of a polybutylene terephthalate component;
   c) from about 0.1 wt % to about 10 wt % of a polyester elastomer component;
   d) from 0 wt % to about 10 wt % of an acrylic impact modifier component;
   e) from 0 wt % to about 10 wt % of an ethylene/alkyl acrylate/glycidyl methacrylate terpolymer compatibilizer component; and
   f) from about 55 wt % to about 75 wt % of a ceramic fiber component,
   wherein,
   a molded sample of the thermoplastic composition has a tensile modulus of at least about 25 gigapascals (GPa) as determined in accordance with ASTM D638 and a tensile elongation at break of at least about 1.98% as determined in accordance with ASTM D638,
   the composition has a melt volume rate (MVR) of from about 12 cm$^3$/10 min to about 25 cm$^3$/10 min as evaluated at 275° C. under a 5 kilogram (kg) load, and
   the combined weight percent value of all components does not exceed 100 wt %, and all weight percent values are based on the total weight of the composition.

2. The composition according to claim 1, wherein the polycarbonate is a homopolymer comprising repeating units derived from bisphenol A, a polycarbonate copolymer comprising repeating units derived from bisphenol A, sebacic acid, polysiloxane, isophthalate terephthalate resorcinol (ITR), phosphate or a combination thereof.

3. The composition according to claim 1, wherein the ceramic fiber component has a tensile modulus of at least 150 GPa when tested in accordance with ASTM D638.

4. The composition according to claim 1, wherein the ceramic fiber component is chopped and has a length from about 0.1 millimeter (mm) to about 12 mm.

5. The composition according to claim 1, wherein the ceramic fiber component comprises alumina.

6. The composition according to claim 1, further comprising a transesterification quenching agent.

7. The composition according to claim 6, wherein the transesterification quenching agent is selected from the group consisting of: an acidic phosphate salt; a Group IB phosphate salt; a Group IIB phosphate salt; a phosphorus oxo-acid; and combinations thereof.

8. The composition according to claim 6, wherein the transesterification quenching agent is present in an amount from greater than about 0 wt % to about 1 wt %.

9. The composition according to claim 1, further comprising an additive material, the additive material selected from the group consisting of: an antioxidant; a colorant; a de-molding agent; a dye; a flow promoter; a flow modifier; a light stabilizer; a lubricant; a mold release agent; a pigment; a quenching agent; a thermal stabilizer; a UV absorbant; a UV reflectant; a UV stabilizer; an epoxy chain extender; a flame retardant; and combinations thereof.

10. The composition according to claim 1, wherein a molded sample of the thermoplastic composition has a notched Izod impact strength of at least about 100 Joules per meter (J/m) as determined in accordance with ASTM D256.

11. The composition according to claim 1, wherein the thermoplastic composition is transparent to radio frequency signals.

12. The composition according to claim 1, wherein the thermoplastic composition is colorable in achromatic colors of black, white or gray.

13. The composition according to claim 1, wherein the thermoplastic composition further comprises from about 0.5 wt % to about 20 wt % titanium dioxide.

14. The composition according to claim 13, wherein a molded sample of the thermoplastic composition retains at least 80% of its tensile properties as compared to a substantially identical molded sample that does not include titanium dioxide.

15. The composition according to claim 1, wherein the thermoplastic composition is chemically resistant.

16. The composition according to claim 1, wherein the thermoplastic composition is flame retardant.

17. An article comprising a composition according to claim 1.

18. The article according to claim 17, wherein the article is extrusion-molded, injection-molded, compression-molded, thermoformed, overmolded, or insert-molded with a metallic or composite laminate insert.

19. The article according to claim 17, wherein the article is selected from the group consisting of: a communication device; a computer device; an electromagnetic interference device; a printed circuit; a Wi-Fi device; a Bluetooth device; a GPS device; a cellular antenna device; a smart phone device; a wireless communication device; a structured media enclosure; an antenna concealing enclosure; an enclosure for networking equipment; a structural component of an electronic device; a portable computing device; a hand-held electronic device; an automotive device; a medical device; a sensor device; a security device; a shielding device; an RF antenna device; an LED device; and an RFID device.

\* \* \* \* \*